United States Patent [19]

Nakazima

[11] Patent Number: 5,001,176

[45] Date of Patent: Mar. 19, 1991

[54] CRYSTALLINE POLYOLEFIN COMPOSITION

[75] Inventor: Hirokazu Nakazima, Chiba, Japan

[73] Assignee: Chisso Corporation, Osaka, Japan

[21] Appl. No.: 391,985

[22] Filed: Aug. 10, 1989

[30] Foreign Application Priority Data

Sep. 5, 1988 [JP] Japan .................................. 63-222040

[51] Int. Cl.$^5$ ............................ C08L 3/02; C08K 5/15
[52] U.S. Cl. ....................................... 524/48; 524/108
[58] Field of Search .................................. 524/48, 108

[56] References Cited

U.S. PATENT DOCUMENTS

| | | | |
|---|---|---|---|
| 2,827,452 | 3/1958 | Schlenk et al. | 260/209 |
| 3,061,444 | 10/1962 | Rogers et al. | 99/140 |
| 3,420,788 | 1/1969 | Solms | 260/17.4 |
| 4,356,115 | 10/1982 | Shibanai et al. | 252/522 |
| 4,419,473 | 12/1983 | Mahaffey, Jr. | 524/104 |
| 4,432,802 | 2/1984 | Harata et al. | 106/163 |
| 4,548,778 | 10/1985 | Fujii | 428/35.7 |
| 4,636,343 | 1/1987 | Shibani | 264/118 |
| 4,677,177 | 6/1987 | Shibanai et al. | 527/300 |
| 4,722,815 | 2/1988 | Shibanai | 264/117 |
| 4,725,657 | 2/1988 | Shibanai | 523/210 |

FOREIGN PATENT DOCUMENTS

| | | |
|---|---|---|
| 0013688 | 6/1980 | European Pat. Off. . |
| 52-108027 | 9/1977 | Japan . |
| 53-142516 | 12/1978 | Japan . |
| 54-962 | 1/1979 | Japan . |
| 60-147455 | 8/1985 | Japan . |
| 62-4289 | 1/1987 | Japan . |
| 62-50355 | 3/1987 | Japan . |
| 62-53360 | 3/1987 | Japan . |
| 62-138545 | 6/1987 | Japan . |
| 1573965 | 3/1977 | United Kingdom . |

OTHER PUBLICATIONS

Fu-Hua Kuan et al., "Structures and Molecular Dynamics of Solid State Inclusion Complexes . . . ", Journal of Inclusion Phenomena, 4, No. 3, pp. 281–290 (1986).

Harata et al., "Interactions of Cyclodextrins with Organic . . . ", Report of Research in Fibre . . . , No. 151, pp. 45–50 (1986).

Uekama, "Pharmaceutical Applications of Cyclodextrin . . . "' (1981), Yakugaku Zasshi (Journal of Pharmacy), 101, No. 10, pp. 857–873.

Uekama et al., "Improvement of Thermal and Photochemical . . . ", 1983, International Journal of Pharmaceutics, 13, No. 3, pp. 253–261.

Ripmeester, "Variable Temperature CP/MAS . . . ", Journal of Inclusion Phenomena, 6, No. 1, pp. 31–40 (1988).

"Applications of Cyclodextrins to a Moth Proof Film, a Mildew Proof Film, a Mildew Proof Film, a Fragrance Film etc.", Gouseijushi (Synthetic Resin) vol. 34, No. 4, pp. 2–9, Apr. 1988.

Primary Examiner—Joseph L. Schofer
Assistant Examiner—Peter D. Mulcahy
Attorney, Agent, or Firm—Leydig, Voit & Mayer

[57] ABSTRACT

A crystalline polyolefin composition is described, comprising a crystalline polyolefin, a dibenzylidenesorbitol-type compound and a cyclodextrin, the amount of said dibenzylidenesorbitol-type compound being 0.01 to 1 part by weight per 100 parts by weight of the crystalline polyolefin, the amount of said cyclodextrin being 0.001 to 1,000 parts by weight per 100 parts by weight of the dibenzylidenesorbitol-type compound, from which formed articles having both excellent transparency and greatly improved odor-non-emitting properties can be obtained.

8 Claims, No Drawings

CRYSTALLINE POLYOLEFIN COMPOSITION

FIELD OF THE INVENTION

This invention relates to a crystalline polyolefin composition from which formed articles having excellent transparency can be obtained. More particularly, the present invention is concerned with a crystalline polyolefin composition which gives formed articles improved in the property of not emitting the odor attributable to dibenzylidenesorbitol-type nucleating agents incorporated in crystalline polyolefins for improving the transparency of the crystalline polyolefins.

BACKGROUND OF THE INVENTION

In general, crystalline polyolefins are relatively inexpensive and have excellent mechanical properties and, hence, they are being used for making various formed articles such as injection-molded articles, blow-molded articles, films, sheets and fibers. However, although the crystalline polyolefins possess excellent mechanical properties, they have the defect of being poor in transparency because of their crystalline nature and, for this reason, their applications are limited. For improving the poor transparency of the crystalline polyolefin, there have so far been used various nucleating agents. Among these, dibenzylidenesorbitol (hereinafter abbreviated as DBS) type compounds are relatively good in the effect of improving transparency, and are being widely used.

However, formed articles manufactured from crystalline polyolefin compositions containing such DBS-type compounds have a drawback that they emit the odor of benzaldehyde-type compounds which have been used as raw materials in synthesizing the DBS-type compounds and are contained therein as impurities or which have been generated through the decomposition of DBS-type compounds by acidic substances such as chlorine in molding or forming operations.

For the purpose of diminishing the odor-emitting properties of the composition prepared by incorporating a DBS-type compound in a crystalline polyolefin, there have been proposed a composition comprising the above composition and a decomposition inhibitor for DBS-type compounds (JP-A-58-21437), a composition comprising the above composition and a metal salt of a carboxylic acid (JP-A-60-147455), and a composition comprising the above composition and a non-aromatic organoamine compound (JP-A-62-4289). (The term "JP-A" as used herein means an "unexamined published Japanese patent application".) Further, there have also been proposed a composition comprising a crystalline polyolefin and a DBS-type compound surface-treated with stabilizers having chlorine-trapping properties which is at least one member selected from metal salts of fatty acids, metal salts of alkyllactic acids, and metal salts of lactic acid (JP-A-62-50355), a composition prepared by kneading said stabilizer beforehand with a crystalline polyolefin, and then incorporating a DBS-type compound in the mixture (JP-A-62-53360), and a composition which is a combination of the above two compositions (JP-A-62-138545).

The above-mentioned crystalline polyolefin compositions proposed in JP-A-58-21437, JP-A-60-147455, JP-A-62-4289, JP-A-62-50355, JP-A-62-53360 and JP-A-62-138545 in order to solve the transparency and odor problems, which compositions comprise crystalline polyolefins and, incorporated therein, DBS-type compounds and other various compounds, show considerably improved transparency and have also been improved to some extent in minimizing odors. However, the above compositions are still insufficient in these properties.

SUMMARY OF THE INVENTION

The present inventor has conducted intensive studies with a view to obtaining a composition free from the above-described problems accompanying the conventional crystalline polyolefin compositions, i.e., to developing a crystalline polyolefin composition having good transparency and improved odor-non-emitting properties.

As a result, it has been found that a crystalline polyolefin composition having improved transparency and minimal odor-emitting properties can be obtained by incorporating in a crystalline polyolefin a dibenzylidenesorbitol-type compound (hereinafter often referred to as "compound A") and a cyclodextrin (hereinafter often referred to as "compound B") in specific amounts, respectively. This invention has been completed based on this finding.

Accordingly, it is an object of the present invention to provide a crystalline polyolefin composition which gives formed articles having improved transparency and odor-emitting properties.

The foregoing and other objects, features and advantages of the present invention will be apparent from the following detailed description and appended claims.

DETAILED DESCRIPTION OF THE INVENTION

According to the present invention, there is provided a crystalline polyolefin composition comprising a crystalline polyolefin, a dibenzylidenesorbitol-type compound and a cyclodextrin, the amount of said dibenzylidenesorbitol-type compound being 0.01 to 1 part by weight per 100 parts by weight of the crystalline polyolefin, the amount of said cyclodextrin being 0.001 to 1,000 parts be weight per 100 parts by weight of the dibenzylidenesorbitol-type compound.

Examples of the crystalline polyolefin employed in the composition of this invention include a crystalline polyolefin such as a crystalline homopolymer of an α-olefin such as ethylene, propylene, butene-1, pentene-1, 4-methyl-pentene-1, hexene-1 or octene-1, a crystalline or low-crystallinity random copolymer of two or more of these α-olefins, or a crystalline block copolymer of two or more of these α-olefins; a copolymer of one of the above-mentioned α-olefins and vinyl acetate or an acrylic ester; a saponification product of this copolymer; a copolymer of one of the above-mentioned α-olefins and an unsaturated silane compound; a copolymer of one of the above-mentioned α-olefins and an unsaturated carboxylic acid or its anhydride; a product of the reaction of this copolymer with a metal ion compound; modified polyolefins prepared by modifying the above-mentioned crystalline polyolefins with an unsaturated carboxylic acid or a derivative thereof; and silane-modified products prepared by modifying the above-mentioned crystalline polyolefins with an unsaturated silane compound. These crystalline polyolefins may be employed alone or in combination of two or more thereof. Furthermore, in the composition of this invention, the crystalline polyolefin may be employed in combination with various synthetic rubbers (such as, for example, a non-crystalline ethylene-propylene random copolymer, a non-crystalline terpolymer of ethylene, propylene and an unconjugated diene, polybutadiene, polyisoprene, polychloroprene, chlorinated polyethylene, chlorinated polypropylene, a fluororubber, a styrene-butadiene rubber, an acrylonitrile-butadiene rubber, a styrene-butadienestyrene block copolymer, a styrene-isoprene-styrene block copolymer, a styrene-ethylene-butylene-styrene block copolymer, and a styrene-propylene-butylenestyrene block copolymer) or thermoplastic synthetic resins (such as, for example, polystyrene, a styreneacrylonitrile copolymer, an acrylonitrile-butadienestyrene copolymer, a polyamide, polyethylene terephthalate, polybutylene terephthalate, a polycarbonate, polyvinyl chloride and a fluorine-containing resin). Especially preferably employed as the crystalline polyolefin is a crystalline propylene homopolymer, a crystalline ethylene-propylene random copolymer, a crystalline propylene-butene-1 random copolymer, a crystalline ethylene-propylene-butene-1 terpolymer, or a crystalline propylene-hexene-butene-1 terpolymer, said copolymers each having a propylene unit content of 70 wt % or higher, or a combination of two or more of these crystalline polymers.

As examples of the compound A employed in the composition of this invention, there may be mentioned 1.3,2.4-dibenzylidenesorbitol, 1.3-benzylidene-2.4-p-methylbenzylidenesorbitol, 1.3-benzylidene-2.4-p-ethylbenzylidenesorbitol, 1.3-p-methylbenzylidene-2.4-benzylidenesorbitol, 1.3-p-ethylbenzylidene-2.4-benzylidenesorbitol, 1.3-p-methylbenzylidene-2.4-p-ethylbenzylidenesorbitol, 1.3-p-ethylbenzylidene-2.4-p-methylbenzylidenesorbitol, 1.3,2.4-di(p-methylbenzylidene)sorbitol, 1.3,2.4-di(p-ethylbenzylidene)sorbitol, 1.3,2.4-di(p-n-propylbenzylidene)sorbitol, 1.3,2.4-di(p-i-propylbenzylidene)sorbitol, 1.3,2.4-di(p-n-butylbenzylidene)-sorbitol, 1.3,2.4-di(p-sec-butylbenzylidene)sorbitol, 1.3,2.4-di(p-t-butylbenzylidene)sorbitol, 1.3,2.4di-(2',4'-dimethylbenzylidene)sorbitol, 1.3,2.4-di(p-methoxybenzylidene-sorbitol, 1.3,2.4-di(p-ethoxybenzylidene)sorbitol, 1.3-benzylidene-2.4-p-chlorobenzylidenesorbitol, 1.3-p-chlorobenzylidene-2.4-benzylidenesorbitol, 1.3-p-chlorobenzylidene-2.4-p-methylbenzylidenesorbitol, 1.3-p-chlorobenzylidene-2.4-p-ethylbenzylidenesorbitol, 1.3-p-methylbenzylidene-2.4-p-chlorobenzylidenesorbitol, 1.3-p-ethylbenzylidene-2.4-p-chlorobenzylidenesorbitol and 1.3,2.4-di(p-chlorobenzylidene)sorbitol. Especially preferred of these are 1.3,2.4-dibenzylidenesorbitol, 1.3,2.4-di(p-methylbenzylidene)sorbitol, 1.3,2.4-di(p-ethylbenzylidene)-sorbitol, 1.3-p-chlorobenzylidene-2.4-p-methylbenzylidenesorbitol and 1.3,2.4-di(p-chlorobenzylidene)sorbitol. These compounds employed as compound A can be obtained by undergoing dehydration condensation under heating (acetalation reaction) of a benzaldehyde with sorbitol in the presence of an acid catalyst, for example, p-toluenesulfonic acid, with the benzaldehyde being used in an amount of 2 moles per mole of sorbitol. These compounds may be employed, as compound A, alone or in combination of two or more thereof. The amount of the compound A incorporated in the composition is from 0.01 to 1 part by weight, preferably from 0.05 to 0.5 part by weight, per 100 parts by weight of the crystalline polyolefin. If the amount of the compound A incorporated is below 0.01 part by weight, the improvement in transparency is insufficient. On the other hand, an amount exceeding 1 part by weight is also disadvantageous in that not only such a large amount is impractical and uneconomical because no further improvement in transparency can be expected, but also blooming of the compound A is apt to occur.

Examples of the compound B employed in the composition of the present invention include α-cyclodextrin, β-cyclodextrin, γ-cyclodextrin, δ-cyclodextrin, and ε-cyclodextrin, and further include derivatives thereof such as glucosyl-α-cyclodextrin, glucosyl-β-cyclodextrin, glucosyl-γ-cyclodextrin, glucosyl-δ-cyclodextrin, glucosyl-ε-cyclodextrin, maltosyl-α-cyclodextrin, maltosyl-β-cyclodextrin, maltosyl-γ-cyclodextrin, maltosyl-δ-cyclodextrin, and maltosyl-ε-cyclodextrin. Particularly preferred of these are α-cyclodextrin, β-cyclodextrin, and γ-cyclodextrin. These cyclodextrins employed as compound B can be obtained by exposing an enzyme for forming cyclodextrin (that is; cyclodextringlucanotransferase) to starch. These cyclodextrin derivatives employed as compound B can be obtained by adding pullulanase as a debranching enzyme to a mixture of the cyclodextrins obtained in the same manner as above and excess amount of glucose or maltose to undergo reverse synthesis reaction. These dextrins may be employed, as compound B, alone or in combination of two or more thereof. The amount of the compound B incorporated in the composition is from 0.001 to 1,000 parts by weight, preferably from 0.01 to 100 parts by weight, per 100 parts by weight of the above-described compound A. If the amount of the compound B incorporated is below 0.001 part by weight, the effect of diminishing the odor-emitting properties is insufficient, while an amount larger than 1,000 parts by weight is not only impractical but uneconomical because the effect of diminishing the odor-emitting properties cannot be heightened any more.

The composition of this invention may contain various other additives which are commonly being incorporated in crystalline polyolefins, as long as the additive used does not defeat the object of this invention. For example, such additives include antioxidants of the phenol, thioether or phosphorus-containing type, light stabilizers, metal deactivators, clarifying agents, nucleating agents, lubricants, antistatic agents, anti-fogging agents, anti-blocking agents, anti-dripping agents, flame retardants, auxiliary flame retardants, pigments, radical generators such as peroxides, halogen scavengers, dispersing or neutralizing agents such as metallic soaps, inorganic fillers (such as talc, mica, clay, wollastonite, zeolite, asbestos, calcium carbonate, aluminum hydroxide, magnesium hydroxide, silicon dioxide, titanium dioxide, zinc oxide, magnesium oxide, zinc sulfide, barium sulfate, calcium silicate, aluminum silicate, glass fibers, potassium titanate, carbon fibers, carbon black, graphite and metal fibers), inorganic fillers of the above kinds treated with surface-treating agents such as coupling agents (of, for example, the silane type, titanate type, boron type, aluminate type, zircoaluminate type), and organic fillers (for example, wood flour, pulp, wastepaper, synthetic fibers, natural fibers). It is especially preferred to incorporated halogen scavengers in combination with compound A, because the decomposition of compound A during molding or forming operations can be prevented and they synergistically prevent the emission of odors. As examples of the halogen scavengers, there may be mentioned metal salts of fatty acids (for example, calcium stearate, sodium stearate, lithium stearate, magnesium stearate, strontium stearate, barium stearate, zinc stearate, aluminum stearate); metal salts of alicyclic carboxylic acids (for example, calcium naphthenate, magnesium naphthenate, zinc naphthenate, sodium naphthenate, aluminum naphthenate); metal salts of aromatic carboxylic acids (for example, calcium benzoate, magnesium benzoate, zinc benzoate, sodium benzoate, aluminum benzoate, sodium p-t-butylbenzoate, aluminum p-t-butylbenzoate); metal salts of hydroxy-fatty acids (for example, calcium lactate, sodium lactate, lithium lactate, magnesium lactate, strontium lactate, barium lactate, zinc lactate, aluminum lactate, calcium 12-hydroxystearate, sodium 12-hydroxystearate, lithium 12-hydroxystearate, magnesium 12-hydroxystearate, strontium 12-hydroxystearate, barium 12-hydroxystearate, zinc 12-hydroxystearate, aluminum 12-hydroxystearate); metal salts of alicyclic hydroxycarboxylic acids (for example, calcium hydroxynaphthenate, magnesium hydroxynaphthenate, zinc hydroxynaphthenate, sodium hydroxynaphthenate, aluminum hydroxynaphthenate); metal salts of aromatic hydroxycarboxylic acids (for example, calcium hydroxybenzoate, magnesium hydroxybenzoate, zinc hydroxybenzoate, sodium hydroxybenzoate, aluminum hydroxybenzoate); metal salts of amino acids; metal salts of carbonic acid (for example, calcium carbonate, magnesium carbonate, sodium carbonate); hydroxides of metals (for example, calcium hydroxide, magnesium hydroxide, aluminum hydroxide); hydrotalcites; metal salts of phosphoric acid (for example, calcium phosphate, sodium phosphate, magnesium phosphate, barium phosphate, zinc phosphate, aluminum phosphate); metal salts of alkylphosphoric acids [for example, calcium (mixed mono and di)stearylphosphate, magnesium (mixed mono and di)stearylphosphate, barium (mixed mono and di)stearylphosphate, zinc (mixed mono and di)stearylphosphate, an aluminum salt of stearyl acid phosphate]; metal salts of aromatic phosphoric acids {for example, sodium bis(p-t-butylphenyl)phosphate, calcium mono(p-t-butylphenyl)phosphate, calcium bis(p-t-butylphenyl)phosphate, magnesium mono(p-t-butylphenyl)phosphate, magnesium bis(p-t-butylphenyl)phosphate, zinc mono(p-t-butylphenyl)phosphate, zinc bis(p-t-butylphenyl)-phosphate, aluminum (p-t-butylphenyl)phosphate, sodium 2,2'-methylene-bis(4,6-di-t-butylphenyl)phosphate, calcium bis[2,2'-methylene-bis(4,6-di-t-butylphenyl)-phosphate], magnesium bis[2,2'-methylene-bis(4,6-di-t-butylphenyl)phosphate], zinc bis[2,2'-methylene-bis(4,6-di-t-butylphenyl)phosphate], aluminum tris[2,2'-methylene-bis(4,6-di-t-butylphenyl)phosphate]}; tribasic lead sulfate; aliphatic amines [for example, hexamethylenetetramine, triethanolamine, triisopropanolamine, N,N-bis(2-hydroxyethyl)laurylamine, N,N-bis(2-hydroxyethyl)-tridecylamine, N,N-bis(2-hydroxyethyl)pentadecylamine, N,N-bis(2-hydroxyethyl)stearylamine]; hxdroxylamine; hindered amines (for example, hindered piperidines, hindered piperazinones); hydrazones; alkenes; cyclic esters; organometallic compounds; benzhydrol; and epoxy compounds (for example, a product of condensation of epichlorohydrin with bisphenol A, a product of condensation of 2-methylepichlorohydrin with bisphenol A, triglycidyl isocyanurate, epoxidized soybean oil, epoxidized linseed oil, epoxidized castor oil). Especially preferred of these are metal salts of fatty acids, hydrotalcites, metal salts of alkylphosphoric acids, epoxy compounds and a combination of two or more thereof. The above-mentioned halogen scavengers may be used alone or in combination of two or more thereof. The amount of the halogen scavengers incorporated in the composition may be from 0.01 to 1 part by weight, preferably from 0.05 to 0.5 part by weight, per 100 parts by weight of the crystalline polyolefin. If the amount is below 0.01 part by weight, the synergistic effect of improving odor-suppression properties cannot be produced. On the other hand, although an amount exceeding 1 part of by weight does not adversely affect the composition, such a large amount is not only impractical but uneconomical because there can be expected no further increase in the effect of synergistically improving odor-suppression properties.

The composition of the present invention can be obtained by mixing the crystalline polyolefin with predetermined amounts of the above-described compound A and compound B and, according to need, above-mentioned various additives which are usually being incorporated in crystalline polyolefins, by means of a usually employed mixer such as a Henschel mixer (trade name), a super mixer, a ribbon blender or a Banbury mixer, and then melt-kneading and pelletizing the resulting mixture at a melt-kneading temperature of from 150° C. to 300° C., preferably from 180° C. to 270° C., by means of a usually employed single-screw extruder, twin-screw extruder, Brabender or rolls. The thus-obtained composition may be subjected to the preparation of desired formed articles according to various forming methods such as injection molding, extrusion molding and blow molding.

As is generally known, the compound A in the composition of this invention acts as a nucleating agent to improve the transparency of the crystalline polyolefin. Compound B is generally known as a clathrate compound in which various compounds are trapped, and it may be assumed that the compound B in the composition serves to diminish odor-emitting properties by means of clathration in which benzaldehyde-type compounds which result from the incorporation of compound A and are causative of odors are trapped in the compound B as guest substances.

The incorporation of compound B in the composition of the present invention is extremely effective in improving the door-suppression properties. This may be attributable to the fact that the above-mentioned benzaldehyde-type compounds are guest substances which are strongly trapped in the compound B, as explained below. That is, a benzaldehyde-type compound is trapped in compound B in such a manner that phenyl groups, which are hydrophobic, of the benzaldehyde-type compound are trapped in cavities of molecules of the compound B, with hydrophilic aldehyde groups of the benzaldehyde-type compound being positioned outside the cavities. As a result, not only the interaction between methine groups in the cavities of molecules of the compound B and phenyl groups of the benzaldehyde-type compound but also the interaction between hydroxyl groups outside the cavities and aldehyde groups of the benzaldehyde-type compound contribute to the clathration. Hence the benzaldehyde-type compound is strongly trapped in the compound B by means of a combination of the hydrogen bond force, ion interdipole force, van der Waals forces, etc. It is believed that the benzaldehyde-type compound which has been thus strongly trapped in the compound B, or which has been stabilized, loses its volatile nature, resulting in greatly improved odor-non-emitting properties.

The composition of the present invention is superior to conventionally known crystalline polyolefin compositions in that is gives formed articles having both excellent transparency and greatly improved odor-suppression properties. Therefore, the composition of this invention can be advantageously used for applications in the field of various formed articles required to have transparency and odor-free properties, such as food containers or food-packing materials including a sealed container, a food tray, a pudding vessel, a jelly vessel, a water tank for coffee maker, and a drinking water bottle, VTR cassette tape cases, cosmetic containers and medical instruments.

The present invention will now be illustrated in more detail with reference to the following Examples and Comparative Examples, but the Examples should not be construed to be limiting the scope of this invention.

In the examples and comparative examples, the transparency and odor-emitting properties of each composition were evaluated according to the following methods.

(1) Transparency: From pellets obtained, a test piece having a length of 50 mm, a width of 25 mm and a thickness of 1 mm was prepared by injection molding, and then its transparency was evaluated by measuring a haze in the test piece in accordance with ASTM D-1003-61.

(2) Odor-emitting properties: From pellets obtained, 40 test pieces each having a length of 50 mm, a width of 25 mm and a thickness of 1 mm were prepared by injection molding. The 40 test pieces were placed in a 500- ml wide-mouthed bottle, and this bottle was sealed and then heated for 3 hours in an oven having a temperature regulated at 80° C. Immediately after the heating, the test pieces were taken out and subjected to an organoleptic test which was done by five examiners to evaluate the odor-emitting properties.

Each examiner evaluated the odor-emitting properties according to the following six-grade criterion, and the average of five marks given by the five examiners was obtained, with the first decimal place of the calculated average value being rounded to the nearest whole number.
0; odorless
1; almost odorless
2; slightly odorous
3; clearly odorous
4; violently odorous
5; unbearable odor

EXAMPLES 1 TO 19 AND COMPARATIVE EXAMPLES 1 TO 4

To 100 parts by weight of an unstabilized, powdery crystalline ethylene-propylene random copolymer (ethylene content 2.5 wt %), as a crystalline polyolefin, having a melt flow rate (MFR) (the amount of a molten resin extruded through an orifice for 10 minutes at 230° C. under a load of 2.16 kg, according to JIS K 6758) of 7.0 g/10 min were added, in a Henschel mixer (trade name), 1.3,2.4-dibenzylidenesorbitol, 1.3,2.4-di(p-methylbenzylidene)sorbitol, 1.3-p-chlorobenzylidene-2.4-p-methylbenzylidenesorbitol or 1.3,2.4-di(p-chlorobenzylidene)-sorbitol as compound A, and α-cyclodextrin, β-cyclodextrin or γ-cyclodextrin as compound B, and further, other additives as specified in Table 1 given later, the proportion of each of the above additives being given in the table. The resulting mixtures were stirred for 3 minutes, subsequently melt-kneaded at 200° C. by means of a single-screw extruder having a bore of 40 mm, and then pelletized. Meanwhile, for the purpose of comparison (Comparative Examples 1 to 4), the additives as specified in Table 1 were incorporated in amounts given in the table into 100 parts by weight of an unstabilized, powdery crystalline ethylene-propylene random copolymer (ethylene content: 2.5 wt %) having an MFR of 7.0 g/10 min, and the resulting mixtures were melt-kneaded and then formed into pellets in the same manner as in Examples 1 to 19.

The thus-obtained pellets of each composition were injection-molded at a resin temperature of 250° C. and a mold temperature of 50° C., thereby preparing test pieces for the evaluation of transparency and odor-emitting properties.

Transparency and odor-emitting properties were evaluated on the thus-obtained test pieces according to the testing methods as described hereinbefore. The results obtained are shown in Table 1.

EXAMPLES 20 TO 38 AND COMPARATIVE EXAMPLES 5 TO 8

To 100 parts by weight of an unstabilized, powdery crystalline ethylene-propylene-butene-1 terpolymer (ethylene content: 2.5 wt %, butene-1 content: 4.5 wt %), as a crystalline polyolefin, having an MFR of 7.0 g/10 min were added, in a Henschel mixer (trade name), 1.3,2.4-dibenzylidenesorbitol, 1.3,2.4-di(p-methylbenzylidene)sorbitol, 1.3,2.4-di(p-ethylbenzylidene)sorbitol, 1.3-p-chlorobenzylidene-2.4-p-methylbenzylidenesorbitol or 1.3,2.4-di(p-chlorobenzylidene)sorbitol as compound A, and α-cyclodextrin, β-cyclodextrin or γ-cyclodextrin as compound B, and further, other additives as specified in Table 2 given later, the proportion of each of the above additives being given in the table. The resulting mixtures were stirred for 3 minutes, subsequently melt-kneaded at 200° C. by means of a single-screw extruder having a bore of 40 mm, and then pelletized. Meanwhile, for the purpose of comparison (Comparative Examples 5 to 8), the additives as specified in Table 2 were incorporated in amounts given in the table into 100 parts by weight of an unstabilized, powdery crystalline ethylene-propylene-butene-1 terpolymer (ethylene content: 2.5 wt %, butene-1 content: 4.5 wt %) having an MFR of 6.0 g/10 min, and the resulting mixtures were melt-kneaded and then formed into pellets in the same manner as in Examples 20 to 38.

The pellets thus obtained were injection-molded at a resin temperature of 250° C. and a mold temperature of 50° C., thereby preparing test pieces for the evaluation of transparency and odor-emitting properties.

Transparency and odor-emitting properties were evaluated on the thus-obtained test pieces according to the testing methods as described hereinbefore. The results obtained are shown in Table 2.

EXAMPLES 39 TO 57 AND COMPARATIVE EXAMPLES 9 TO 12

To 100 parts by weight of an unstabilized, powdery crystalline ethylene-propylene-butene-1 terpolymer (ethylene content: 4.0 wt %, butene-1 content: 4.5 wt %), as a crystalline polyolefin, having an MFR of 7.0 g/10 min were added, in a Henschel mixer (trade name), 1.3,2.4-dibenzylidenesorbitol, 1.3,2.4-di(p-methylbenzylidene)sorbitol, 1.3,2.4-di(p-ethylbenzylidene)sorbitol, 1.3-p-chlorobenzylidene-2.4-p-methylbenzylidenesorbitol or 1.3,2.4-di(p-chlorobenzylidene)sorbitol as compound A, and α-cyclodextrin, β-cyclodextrin or γ-cyclodextrin as compound B, and further, other additives as specified in Table 3 given later, the proportion of each of above additives being in the table. The resulting mixtures were stirred for 3 minutes, subsequently melt-kneaded at 200° C. by means of a single-screw extruder having a bore of 40 mm, and then pelletized. Meanwhile, for the purpose of comparison (Comparative Examples 9 to 12), the additives as specified in Table 3 were incorporated in amounts given in the table into 100 parts by weight of an unstabilized, powdery crystalline ethylene-propylene-butene-1 terpolymer (ethylene content: 4.0 wt %, butene-1 content: 4.5 wt %) having an MFR of 7.0 g/10 min, and the resulting mixtures were melt-kneaded and then formed into pellets in the same manner as in Examples 39 to 57.

The pellets thus obtained were injection-molded at a resin temperature of 250° C. and a mold temperature of 50° C., thereby preparing test pieces for the evaluation of transparency and odor-emitting properties.

Transparency and odor-emitting properties were evaluated on the thus-obtained test pieces according to the testing methods as described hereinbefore. The results obtained are shown in Table 3.

EXAMPLES 58 TO 76 AND COMPARATIVE EXAMPLES 13 TO 16

To 100 parts by weight of a mixture, as a crystalline polyolefin, which was composed of a 70 wt % unstabilized, powdery crystalline ethylene-propylene random copolymer (ethylene content: 4.0 wt %) having an MFR of 2.0 g/10 min, a 10 wt % unstabilized, powdery crystalline propylene homopolymer having an MFR of 6.0 g/10 min and a 20 wt % unstabilized, powdery low-density ethylene homopolymer having a melt index (MI) (the amount of a molten resin extruded through an orifice for 10 minutes at 190° C. under a load of 2.16 kg, according to JIS K 6760) of 3.0 g/10 min were added, in a Henschel mixer (trade name), 1.3,2.4-dibenzylidenesorbitol, 1.3,2.4-di(p-methylbenzylidene)sorbitol, 1.3,2.4-di(p-ethylbenzylidene)sorbitol, 1.3-p-chlorobenzylidene-2.4-p-methylbenzylidenesorbitol or 1.3,2.4-di(p-chlorobenzylidene)sorbitol as compound A, and α-cyclodextrin, β-cyclodextrin or γ-cyclodextrin as compound B, and further, other additives as specified in Table 4 given later, the proportion of each of the above additives being in the table. The resulting mixtures were stirred for 3 minutes, subsequently melt-kneaded at 200° C. by means of a single-screw extruder having a bore of 40 mm, and then pelletized. Meanwhile, for the purpose of comparison (Comparative Examples 13 to 16), the additives as specified in Table 4 were incorporated in amounts given in the table into 100 parts by weight of a mixture composed of a 70 wt % unstabilized, powdery crystalline ethylene-propylene random copolymer (ethylene content: 4.0 wt %) having an MFR of 2.0 g/10 min, a 10 wt % unstabilized, powdery crystalline propylene homopolymer having an MFR of 6.0 g/10 min and a 20 wt % unstabilized, powdery low-density ethylene homopolymer having an MI of 3.0 g/10 min, and the resulting mixtures were melt-kneaded and then formed into pellets in the same manner as in Examples 58 to 76.

The pellets thus obtained were injection-molded at a resin temperature of 250° C. and a mold temperature of 50° C., thereby preparing test pieces for the evaluation of transparency and odor-emitting properties.

Transparency and odor-emitting properties were evaluated on the thus-obtained test pieces according to the testing methods as described hereinbefore. The results obtained are shown in Table 4.

The compounds A and B, employed according to the present invention, and other additives given in Tables 1 to 4 are as follows.

Compound A [I]: 1.3,2.4-dibenzylidenesorbitol
Compound A [II]: 1.3,2.4-di(p-methylbenzylidene)-sorbitol
Compound A [III]: 1.3,2.4-di(p-ethylbenzylidene)sorbitol
Compound A [IV]: 1.3-p-chlorobenzylidene-2.4-p-methylbenzylidenesorbitol
Compound A [V]: 1.3,2.4-di(p-chlorobenzylidene)-sorbitol
Compound B [I]: α-cyclodextrin
Compound B [II]: β-cyclodextrin
Compound B [III]: γ-cyclodextrin
Phosphorus-containing antioxidant 1: bis(2,4-di-t-butylphenyl)pentaerythritol diphosphite
Phosphorus-containing antioxidant 2: bis(2,6-di-t-butyl-4-methylphenyl)-pentaerythritol diphosphite
Phosphorus-containing antioxidant 3: tetrakis(2,4-di-t-butylphenyl)-4,4'-biphenylene diphosphonite
Phosphorus-containing antioxidant 4: tris(2,4-di-t-butylphenyl) phosphite
Phenolic antioxidant: tetrakis[methylene-3-(3',5'-di-t-butyl-4'-hydroxyphenyl)propionate]methane
Halogen scavenger 1: calcium stearate
Halogen scavenger 2: hydrotalcite (DHT-4A, manufactured by Kyowa Chemical Co., Ltd., Japan)
Halogen scavenger 3: calcium(mixed mono and di)-stearylphosphate (LBT-1820, manufactured by Sakai Chemical Industry Co., Ltd., Japan)
Halogen scavenger 4: A mixture of a product of condensation of epichlorohydrin with bisphenol A and a product of condensation of 2-methylepichlorohydrin with bisphenol A (epoxy equivalent, 180 to 200; MARK EP-17, manufactured by Adeka Argus Chemical Co., Ltd., Japan)

TABLE 1

| Composition (parts by weight)* | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Compound A [I] | 0.25 | — | — | — | — | 0.25 | — | — | — | — | 0.25 | — | — | — | — | — |
| Compound A [II] | — | 0.25 | — | — | — | — | 0.25 | — | — | — | — | 0.25 | — | — | — | 0.25 |
| Compound A [III] | — | — | 0.25 | — | — | — | — | 0.25 | — | — | — | — | 0.25 | — | — | — |
| Compound A [IV] | — | — | — | 0.25 | — | — | — | — | 0.25 | — | — | — | — | 0.25 | — | — |
| Compound A [V] | — | — | — | — | 0.25 | — | — | — | — | 0.25 | — | — | — | — | 0.25 | — |
| Compound B [I] | 0.1 (40) | 0.1 (40) | 0.1 (40) | 0.1 (40) | 0.1 (40) | — | — | — | — | — | — | — | — | — | — | — |
| Compound B [II] | — | — | — | — | — | 0.1 (40) | 0.1 (40) | 0.1 (40) | 0.1 (40) | 0.1 (40) | — | — | — | — | — | 0.1 (40) |
| Compound B [III] | — | — | — | — | — | — | — | — | — | — | 0.1 (40) | 0.1 (40) | 0.1 (40) | 0.1 (40) | 0.1 (40) | — |
| Phosphorus- | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |

TABLE 1-continued

| | | | | | | | | | | | | | | | | |
|---|---|---|---|---|---|---|---|---|---|---|---|---|---|---|---|---|
| containing antioxidant 1 | | | | | | | | | | | | | | | | |
| Phenolic antioxidant | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Halogen scavenger 1 | — | — | — | — | — | — | — | — | — | — | — | — | — | — | — | 0.1 |
| Halogen scavenger 2 | — | — | — | — | — | — | — | — | — | — | — | — | — | — | — | — |
| Halogen scavenger 3 | — | — | — | — | — | — | — | — | — | — | — | — | — | — | — | — |
| Halogen scavenger 4 | — | — | — | — | — | — | — | — | — | — | — | — | — | — | — | — |
| Haze (%) | 12.4 | 7.8 | 7.7 | 9.2 | 9.1 | 12.1 | 7.7 | 7.7 | 9.1 | 9.0 | 12.2 | 7.8 | 7.7 | 9.4 | 9.5 | 7.6 |
| Odor-emitting property | 1 | 2 | 2 | 1 | 1 | 1 | 2 | 2 | 1 | 1 | 1 | 2 | 2 | 1 | 1 | 1 |

| | Example | | | Comparative Example | | | |
|---|---|---|---|---|---|---|---|
| | 17 | 18 | 19 | 1 | 2 | 3 | 4 |
| Composition (parts by weight)* | | | | | | | |
| Compound A [I] | — | — | — | — | — | — | — |
| Compound A [II] | 0.25 | 0.25 | 0.25 | 0.25 | 0.25 | 0.25 | 0.25 |
| Compound A [III] | — | — | — | — | — | — | — |
| Compound A [IV] | — | — | — | — | — | — | — |
| Compound A [V] | — | — | — | — | — | — | — |
| Compound B [I] | — | — | — | — | — | — | — |
| Compound B [II] | 0.1 (40) | 0.1 (40) | 0.1 (40) | — | — | — | — |
| Compound B [III] | — | — | — | — | — | — | — |
| Phosphorus-containing antioxidant 1 | 0.05 | 0.05 | 0.05 | 0.05 | 0.05 | 0.05 | 0.05 |
| Phenolic antioxidant | 0.05 | 0.05 | 0.05 | 0.05 | 0.05 | 0.05 | 0.05 |
| Halogen scavenger 1 | — | — | — | 0.1 | — | — | — |
| Halogen scavenger 2 | 0.1 | — | — | — | 0.1 | — | — |
| Halogen scavenger 3 | — | 0.1 | — | — | — | 0.1 | — |
| Halogen scavenger 4 | — | — | 0.1 | — | — | — | 0.1 |
| Haze (%) | 7.5 | 7.6 | 7.7 | 7.5 | 7.6 | 7.8 | 7.6 |
| Odor-emitting property | 1 | 1 | 1 | 4 | 4 | 4 | 4 |

Note
*The amounts (parts by weight) of compounds and additives are based on 100 parts by weight of resin (provided that the values given in parentheses for compound B are based on 100 parts by weight of compound A).

TABLE 2

| | Example | | | | | | | | | | | | | | | |
|---|---|---|---|---|---|---|---|---|---|---|---|---|---|---|---|---|
| | 20 | 21 | 22 | 23 | 24 | 25 | 26 | 27 | 28 | 29 | 30 | 31 | 32 | 33 | 34 | 35 |
| Composition (parts by weight)* | | | | | | | | | | | | | | | | |
| Compound A [I] | 0.5 | — | — | — | — | 0.25 | — | — | — | — | 0.25 | — | — | — | — | — |
| Compound A [II] | — | 0.5 | — | — | — | — | 0.25 | — | — | — | — | 0.25 | — | — | — | 0.25 |
| Compound A [III] | — | — | 0.5 | — | — | — | — | 0.25 | — | — | — | — | 0.25 | — | — | — |
| Compound A [IV] | — | — | — | 0.5 | — | — | — | — | 0.25 | — | — | — | — | 0.25 | — | — |
| Compound A [V] | — | — | — | — | 0.5 | — | — | — | — | 0.25 | — | — | — | — | 0.25 | — |
| Compound B [I] | 0.05 (10) | 0.05 (10) | 0.05 (10) | 0.05 (10) | 0.05 (10) | — | — | — | — | — | — | — | — | — | — | — |
| Compound B [II] | — | — | — | — | — | 0.01 (4) | 0.01 (4) | 0.01 (4) | 0.01 (4) | 0.01 (4) | — | — | — | — | — | 0.01 (4) |
| Compound B [III] | — | — | — | — | — | — | — | — | — | — | 0.01 (4) | 0.01 (4) | 0.01 (4) | 0.01 (4) | 0.01 (4) | — |
| Phosphorus-containing antioxidant 2 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Phenolic antioxidant | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Halogen scavenger 1 | — | — | — | — | — | — | — | — | — | — | — | — | — | — | — | 0.2 |
| Halogen scavenger 2 | — | — | — | — | — | — | — | — | — | — | — | — | — | — | — | — |
| Halogen scavenger 3 | — | — | — | — | — | — | — | — | — | — | — | — | — | — | — | — |
| Halogen scavenger 4 | — | — | — | — | — | — | — | — | — | — | — | — | — | — | — | — |
| Haze (%) | 11.1 | 7.2 | 7.1 | 8.4 | 8.5 | 11.0 | 7.0 | 6.9 | 8.2 | 8.1 | 11.0 | 7.1 | 6.9 | 8.4 | 8.2 | 7.1 |
| Odor-emitting property | 1 | 2 | 2 | 1 | 1 | 1 | 2 | 2 | 1 | 1 | 1 | 2 | 2 | 1 | 1 | 1 |

TABLE 2-continued

|  | Example | | | Comparative Example | | | |
|---|---|---|---|---|---|---|---|
|  | 36 | 37 | 38 | 5 | 6 | 7 | 8 |
| Composition (parts by weight)* | | | | | | | |
| Compound A [I] | — | — | — | — | — | — | — |
| Compound A [II] | 0.25 | 0.25 | 0.25 | 0.25 | 0.25 | 0.25 | 0.25 |
| Compound A [III] | — | — | — | — | — | — | — |
| Compound A [IV] | — | — | — | — | — | — | — |
| Compound A [V] | — | — | — | — | — | — | — |
| Compound B [I] | — | — | — | — | — | — | — |
| Compound B [II] | 0.01 (4) | 0.01 (4) | 0.01 (4) | — | — | — | — |
| Compound B [III] | — | — | — | — | — | — | — |
| Phosphorus-containing antioxidant 2 | 0.05 | 0.05 | 0.05 | 0.05 | 0.05 | 0.05 | 0.05 |
| Phenolic antioxidant | 0.05 | 0.05 | 0.05 | 0.05 | 0.05 | 0.05 | 0.05 |
| Halogen scavenger 1 | — | — | — | 0.2 | — | — | — |
| Halogen scavenger 2 | 0.2 | — | — | — | 0.2 | — | — |
| Halogen scavenger 3 | — | 0.2 | — | — | — | 0.2 | — |
| Halogen scavenger 4 | — | — | 0.2 | — | — | — | 0.2 |
| Haze (%) | 7.0 | 6.9 | 7.1 | 7.1 | 7.0 | 7.0 | 7.2 |
| Odor-emitting property | 1 | 1 | 1 | 4 | 4 | 4 | 4 |

Note
*The amounts (parts by weight) of compounds and additives are based on 100 parts by weight of resin (provided that the values given in parentheses for compound B are based on 100 parts by weight of compound A).

TABLE 3

| | Example | | | | | | | | | | | | | | | |
|---|---|---|---|---|---|---|---|---|---|---|---|---|---|---|---|
| | 39 | 40 | 41 | 42 | 43 | 44 | 45 | 46 | 47 | 48 | 49 | 50 | 51 | 52 | 53 | 54 |
| Composition (parts by weight)* | | | | | | | | | | | | | | | | |
| Compound A [I] | 0.25 | — | — | — | — | 0.75 | — | — | — | — | 0.25 | — | — | — | — | — |
| Compound A [II] | — | 0.25 | — | — | — | — | 0.75 | — | — | — | — | 0.25 | — | — | — | 0.25 |
| Compound A [III] | — | — | 0.25 | — | — | — | — | 0.75 | — | — | — | — | 0.25 | — | — | — |
| Compound A [IV] | — | — | — | 0.25 | — | — | — | — | 0.75 | — | — | — | — | 0.25 | — | — |
| Compound A [V] | — | — | — | — | 0.25 | — | — | — | — | 0.75 | — | — | — | — | 0.25 | — |
| Compound B [I] | 0.001 (0.4) | 0.001 (0.4) | 0.001 (0.4) | 0.001 (0.4) | 0.001 (0.4) | — | — | — | — | — | — | — | — | — | — | — |
| Compound B [II] | — | — | — | — | — | 0.15 (20) | 0.15 (20) | 0.15 (20) | 0.15 (20) | 0.15 (20) | — | — | — | — | — | 0.001 (0.4) |
| Compound B [III] | — | — | — | — | — | — | — | — | — | — | 0.001 (0.4) | 0.001 (0.4) | 0.001 (0.4) | 0.001 (0.4) | 0.001 (0.4) | — |
| Phosphorus-containing antioxidant 3 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Phenolic antioxidant | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Halogen scavenger 1 | — | — | — | — | — | — | — | — | — | — | — | — | — | — | — | 0.01 |
| Halogen scavenger 2 | — | — | — | — | — | — | — | — | — | — | — | — | — | — | — | — |
| Halogen scavenger 3 | — | — | — | — | — | — | — | — | — | — | — | — | — | — | — | — |
| Halogen scavenger 4 | — | — | — | — | — | — | — | — | — | — | — | — | — | — | — | — |
| Haze (%) | 10.8 | 7.1 | 6.8 | 8.0 | 8.2 | 10.5 | 6.7 | 6.5 | 7.9 | 8.0 | 10.6 | 6.7 | 6.5 | 8.0 | 7.8 | 6.6 |
| Odor-emitting property | 1 | 2 | 2 | 1 | 1 | 1 | 2 | 2 | 1 | 1 | 1 | 2 | 2 | 1 | 1 | 1 |

| | Example | | | Comparative Example | | | |
|---|---|---|---|---|---|---|---|
| | 55 | 56 | 57 | 9 | 10 | 11 | 12 |
| Composition (parts by weight)* | | | | | | | |
| Compound A [I] | — | — | — | — | — | — | — |
| Compound A [II] | 0.25 | 0.25 | 0.25 | 0.25 | 0.25 | 0.25 | 0.25 |
| Compound A [III] | — | — | — | — | — | — | — |
| Compound A [IV] | — | — | — | — | — | — | — |
| Compound A [V] | — | — | — | — | — | — | — |
| Compound B [I] | — | — | — | — | — | — | — |
| Compound B [II] | 0.001 (0.4) | 0.001 (0.4) | 0.001 (0.4) | — | — | — | — |

TABLE 3-continued

|  | | | | | | | | |
|---|---|---|---|---|---|---|---|---|
| Compound B [III] | — | — | — | — | — | — | — |
| Phosphorus-containing antioxidant 3 | 0.05 | 0.05 | 0.05 | 0.05 | 0.05 | 0.05 | 0.05 |
| Phenolic antioxidant | 0.05 | 0.05 | 0.05 | 0.05 | 0.05 | 0.05 | 0.05 |
| Halogen scavenger 1 | — | — | — | 0.01 | — | — | — |
| Halogen scavenger 2 | 0.01 | — | — | — | 0.01 | — | — |
| Halogen scavenger 3 | — | 0.01 | — | — | — | 0.01 | — |
| Halogen scavenger 4 | — | — | 0.01 | — | — | — | 0.01 |
| Haze (%) | 6.7 | 6.5 | 6.6 | 6.2 | 6.3 | 6.4 | 6.3 |
| Odor-emitting property | 1 | 1 | 1 | 4 | 4 | 4 | 4 |

Note
*The amounts (parts by weight) of compounds and additives are based on 100 parts by weight of resin (provided that the values given in parentheses for compound B are based on 100 parts by weight of compound A).

TABLE 4

| | Example |||||||||||||
|---|---|---|---|---|---|---|---|---|---|---|---|---|---|
| | 58 | 59 | 60 | 61 | 62 | 63 | 64 | 65 | 66 | 67 | 68 | 69 | 70 |
| Composition (parts by weight)* | | | | | | | | | | | | | |
| Compound A [I] | 0.25 | — | — | — | — | 0.25 | — | — | — | — | 1.0 | — | — |
| Compound A [II] | — | 0.25 | — | — | — | — | 0.25 | — | — | — | — | 0.01 | — |
| Compound A [III] | — | — | 0.25 | — | — | — | — | 0.25 | — | — | — | — | 0.01 |
| Compound A [IV] | — | — | — | 0.25 | — | — | — | — | 0.25 | — | — | — | — |
| Compound A [V] | — | — | — | — | 0.25 | — | — | — | — | 0.25 | — | — | — |
| Compound B [I] | 0.0001 (0.04) | 0.0001 (0.04) | 0.0001 (0.04) | 0.0001 (0.04) | 0.0001 (0.04) | — | — | — | — | — | — | — | — |
| Compound B [II] | — | — | — | — | — | 0.0001 (0.04) | 0.0001 (0.04) | 0.0001 (0.04) | 0.0001 (0.04) | 0.0001 (0.04) | — | — | — |
| Compound B [III] | — | — | — | — | — | — | — | — | — | — | $10^{-5}$ (0.001) | 0.1 (10) | 0.01 (1) |
| Phosphorus-containing antioxidant 4 | 0.05 | 0.05 | 0.05 | 0.05 | 0.05 | 0.05 | 0.05 | 0.05 | 0.05 | 0.05 | 0.05 | 0.05 | 0.05 |
| Phenolic antioxidant | 0.05 | 0.05 | 0.05 | 0.05 | 0.05 | 0.05 | 0.05 | 0.05 | 0.05 | 0.05 | 0.05 | 0.05 | 0.05 |
| Halogen scavenger 1 | — | — | — | — | — | — | — | — | — | — | — | — | — |
| Halogen scavenger 2 | — | — | — | — | — | — | — | — | — | — | — | — | — |
| Halogen scavenger 3 | — | — | — | — | — | — | — | — | — | — | — | — | — |
| Halogen scavenger 4 | — | — | — | — | — | — | — | — | — | — | — | — | — |
| Haze (%) | 14.5 | 8.8 | 8.5 | 10.6 | 10.1 | 14.0 | 8.5 | 8.0 | 10.2 | 9.8 | 14.2 | 8.6 | 8.3 |
| Odor-emitting property | 1 | 2 | 2 | 1 | 1 | 1 | 2 | 2 | 1 | 1 | 1 | 2 | 2 |

| | Example |||||| Comparative Example ||||
|---|---|---|---|---|---|---|---|---|---|---|
| | 71 | 72 | 73 | 74 | 75 | 76 | 13 | 14 | 15 | 16 |
| Composition (parts by weight)* | | | | | | | | | | |
| Compound A [I] | — | — | — | — | — | — | — | — | — | — |
| Compound A [II] | — | — | 0.25 | 0.25 | 0.25 | 0.25 | 0.25 | 0.25 | 0.25 | 0.25 |
| Compound A [III] | — | — | — | — | — | — | — | — | — | — |
| Compound A [IV] | 1.0 | — | — | — | — | — | — | — | — | — |
| Compound A [V] | — | 1.0 | — | — | — | — | — | — | — | — |
| Compound B [I] | — | — | — | — | — | — | — | — | — | — |
| Compound B [II] | — | — | 0.0001 (0.04) | 0.0001 (0.04) | 0.0001 (0.04) | 0.0001 (0.04) | — | — | — | — |
| Compound B [III] | 1.0 (100) | $10^{-5}$ (0.001) | — | — | — | — | — | — | — | — |
| Phosphorus-containing antioxidant 4 | 0.05 | 0.05 | 0.05 | 0.05 | 0.05 | 0.05 | 0.05 | 0.05 | 0.05 | 0.05 |
| Phenolic antioxidant | 0.05 | 0.05 | 0.05 | 0.05 | 0.05 | 0.05 | 0.05 | 0.05 | 0.05 | 0.05 |
| Halogen scavenger 1 | — | — | 1.0 | — | — | — | 1.0 | — | — | — |
| Halogen scavenger 2 | — | — | — | 1.0 | — | — | — | 1.0 | — | — |
| Halogen scavenger 3 | — | — | — | — | 1.0 | — | — | — | 1.0 | — |
| Halogen scavenger 4 | — | — | — | — | — | 1.0 | — | — | — | 1.0 |

TABLE 4-continued

| 4 | | | | | | | | | |
|---|---|---|---|---|---|---|---|---|---|
| Haze (%) | 10.5 | 10.0 | 8.3 | 8.1 | 8.5 | 8.4 | 8.3 | 8.2 | 8.2 | 8.4 |
| Odor-emitting property | 1 | 1 | 1 | 1 | 1 | 1 | 4 | 4 | 4 | 4 |

Note
*The amounts (parts by weight) of compounds and additives are based on 100 parts by weight of resin (provided that the values given in parentheses for compound B are based on 100 parts by weight of compound A).

In Table 1, the results of the examples and comparative examples in which a crystalline ethylenepropylene random copolymer was used as a crystalline polyolefin are summarized. Table 1 shows that the compositions of Examples 1 to 19 according to the present invention in which compound A and compound B have been incorporated show greatly improved odor-non-emitting properties as compared with the compositions of Comparative Examples 1 to 4 in which various halogen scavengers have been incorporated in place of compound B. Moreover, Table 1 also shows that the compositions of Examples 16 to 19 which are different from the compositions of Examples 1 to 15 in that they employ various halogen scavengers in combination with compounds B have been further improved in the property of preventing the odor of compound A, showing a remarkable synergistic effect of the compound B and the halogen scavengers.

Furthermore, it can be seen from Table 1 that the compositions of the present invention in which both compound A and compound B have been incorporated are never inferior in transparency to the conventional compositions in which only compound A has been incorporated.

Tables 2 to 4 respectively show the results of examples employing, as a crystalline polyolefin, a crystalline ethylene-propylene-butene-1 terpolymer, a crystalline ethylene-propylene-butene-1 terpolymer, and a mixture of a crystalline ethylene-propylene random copolymer, a crystalline propylene homopolymer and a low-density ethylene homopolymer. In the cases of these compositions also, effects similar to those as described above were confirmed.

While the invention has been described in detail and with reference to specific embodiments thereof, it will be apparent to one skilled in the art that various changes and modifications can be made therein without departing from the spirit and scope thereof.

What is claimed is:

1. A crystalline polyolefin composition comprising a crystalline polyolefin, a dibenzylidenesorbitol-type compound and a cyclodextrin, the amount of said dibenzylidenesorbitol-type compound being 0.01 to 1 part by weight per 100 parts by weight of the crystalline polyolefin, the amount of said cyclodextrin being at least 0.001 to 1,000 parts by weight per 100 parts by weight of the dibenzylidenesorbitol-type compound.

2. A crystalline polyolefin composition as claimed in claim 1, wherein said dibenzylidenesorbitol-type compound is at least one member selected from the group consisting of 1.3,2.4-dibenzylidenesorbitol, 1.3,2.4-di(p-methylbenzylidene)sorbitol, 1.3,2.4-di(p-ethylbenzylidene)sorbitol, 1.3-p-chlorobenzylidene-2.4-p-methylbenzylidenesorbitol and 1.3,2.4-di(p-chlorobenzylidene)sorbitol.

3. A crystalline polyolefin composition as claimed in claim 1, wherein said cyclodextrin is at least one member selected from the group consisting of α-cyclodextrin, β-cyclodextrin and γ-cyclodextrin.

4. A crystalline polyolefin composition as claimed in claim 1, wherein said crystalline polyolefin is at least one member selected from the group consisting of a crystalline propylene homopolymer, a crystalline ethylene-propylene random copolymer, a crystalline propylene-butene-1 random copolymer, a crystalline ethylene-propylene-butene-1 terpolymer, and a crystalline propylene-hexene-butene-1 terpolymer, said copolymers each having a propylene unit content of 70 wt % or higher.

5. A crystalline polyolefin composition as claimed in claim 1, which further comprises at least 0.01 to 1 part by weight of a halogen scavenger per 100 parts by weight of the crystalline polyolefin.

6. A crystalline polyolefin composition as claimed in claim 5, wherein said halogen scavenger is at least one member selected from the group consisting of metal salts of fatty acids, hydrotalcites, metal salts of alkylphosphoric acids, and epoxy compounds.

7. A crystalline polyolefin composition as claimed in claim 1 wherein the amount of said cyclodextrin is no more than 1,000 parts by weight per 100 parts by weight of the dibenzylidene sorbitol-type compound.

8. A crystalline polyolefin composition as claimed in claim 5 wherein the weight of halogen scavenger is no more than 1 part per 100 parts of crystalline polypolefin.

* * * * *

UNITED STATES PATENT AND TRADEMARK OFFICE
CERTIFICATE OF CORRECTION

PATENT NO. : 5,001,176
DATED : March 19, 1991
INVENTOR(S) : Hirokazu Nakazima

It is certified that error appears in the above-indentified patent and that said Letters Patent is hereby corrected as shown below:

Claim 1, column 18, line 11, delete "to 1,000".

Claim 2, column 18, line 16, change "1.3,2.4" to --1•3,2•4-- (both occurrences);

line 17, delete the space between "sorbitol, and 1.3,2.4";

change "1.3,2.4" to --1•3,2•4--;

line 18, delete the space between "sorbitol, and 1.3";

change "1.3" to --1•3--;

change "2.4" to --2•4--;

line 19, change "1.3,2.4" to --1•3,2•4--.

Claim 5, column 18, line 36, delete "to 1".

UNITED STATES PATENT AND TRADEMARK OFFICE
CERTIFICATE OF CORRECTION

PATENT NO. : 5,001,176
DATED : March 19, 1991
INVENTOR(S) : Hirokazu Nakazima

It is certified that error appears in the above-indentified patent and that said Letters Patent is hereby corrected as shown below:

Claim 5, column 18, line 36, delete "to 1".

Signed and Sealed this

Fifteenth Day of June, 1993

Attest:

MICHAEL K. KIRK

*Attesting Officer*  *Acting Commissioner of Patents and Trademarks*